(12) United States Patent
Puttichaem et al.

(10) Patent No.: US 9,025,283 B1
(45) Date of Patent: May 5, 2015

(54) LAMINATED SUSPENSION FLEXURE WITH OPEN POLYIMIDE BASE

(71) Applicant: Western Digital Technologies, Inc., Irvine, CA (US)

(72) Inventors: Wachira Puttichaem, Muang (TH); Adisak Tokaew, Muang (TH); Tzong-Shii Pan, San Jose, CA (US); Syahril Zainudin, Shah Alam (MY); Chaivat Poparisut, Bang Yai (TH)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/065,574

(22) Filed: Oct. 29, 2013

Related U.S. Application Data

(60) Provisional application No. 61/879,241, filed on Sep. 18, 2013.

(51) Int. Cl.
  *G11B 5/39* (2006.01)
  *G11B 5/48* (2006.01)
(52) U.S. Cl.
  CPC .............. *G11B 5/4826* (2013.01); *G11B 5/486* (2013.01)
(58) Field of Classification Search
  USPC ....................................................... 360/245.9
  See application file for complete search history.

(56) References Cited

U.S. PATENT DOCUMENTS

| | | | | |
|---|---|---|---|---|
| 5,995,328 | A * | 11/1999 | Balakrishnan | 360/245.9 |
| 6,424,499 | B1 * | 7/2002 | Balakrishnan et al. | 360/245.9 |
| 7,006,330 | B1 * | 2/2006 | Subrahmanyam et al. | 360/234.5 |
| 7,433,157 | B2 | 10/2008 | Arya et al. | |
| 7,450,346 | B2 | 11/2008 | Arya et al. | |
| 7,646,567 | B2 * | 1/2010 | Backlund et al. | 360/264.2 |
| 7,724,478 | B2 * | 5/2010 | Deguchi et al. | 360/245.9 |
| 7,924,532 | B2 | 4/2011 | Jeong et al. | |
| 8,085,507 | B2 | 12/2011 | Arya et al. | |
| 8,259,415 | B2 | 9/2012 | Hutchinson et al. | |
| 8,295,014 | B1 * | 10/2012 | Teo et al. | 360/245.9 |
| 8,325,446 | B1 | 12/2012 | Liu et al. | |
| 8,488,281 | B1 * | 7/2013 | Pan | 360/294.4 |
| 8,665,564 | B2 * | 3/2014 | Zhou et al. | 360/245.9 |
| 2012/0160538 | A1 * | 6/2012 | Contreras et al. | 174/115 |

* cited by examiner

*Primary Examiner* — Mark Blouin

(57) ABSTRACT

A laminated structure includes a metallic layer, a dielectric layer on the metallic layer, wherein the dielectric layer and metallic layer have a slot formed therein, and one or more conductive traces on the dielectric layer opposite the metallic layer, wherein the ends of the one or more traces terminate to form bonding pads extending into the slot. A method of forming a slotted laminated structure includes forming a metallic layer, forming a dielectric layer on the metallic layer, forming a slot in the dielectric layer and metallic layer, and forming one or more electrically conductive traces on the dielectric layer opposite the metallic layer, wherein ends of the one or more traces are formed to terminate with bonding pads extending into the slot.

24 Claims, 5 Drawing Sheets

LAMINATED SUSPENSION FLEXURE WITH OPEN POLYIMIDE BASE

CROSS-REFERENCE TO RELATED APPLICATIONS

This application claims priority to provisional U.S. Patent Application Ser. No. 61/879,241, filed on Sep. 18, 2013, which is hereby incorporated by reference in its entirety.

BACKGROUND

The disclosure relates to bond pads on a suspension tail for hard disk drive head stack assemblies.

Information storage devices are used to retrieve and/or store data in computers and other consumer electronics devices. A magnetic hard disk drive is an example of an information storage device that includes one or more heads that can both read and write. A contemporary trend is to include more devices in and on the head, e.g., a head stack assembly, which may facilitate reading and writing (for example, a heater to reduce head-disk spacing during reading or writing), and/or perform other functions such as microactuation or lapping control. As more devices are included in and on the head, the number of electrical connections to the head must increase.

Each of the read/write heads are controlled by signals transmitted to and from the heads through traces on a corresponding suspension flexure. The traces on the suspension flexure are bonded to the head at appropriate corresponding bonding pads. A typical approach to joining the traces on the suspension flexure to the head may be solder jet bonding.

A conventional suspension bond pad rests on polyimide base. Typically, there is a continuous layer of polyimide between the traces at the points of solder jet bonding. Two disadvantageous effects may occur, e.g., solder bridging across the polyimide between adjacent traces may occur, and the polyimide may incur burning as a result of the soldering, introducing contaminants in the bonding region. Solder bridging and burning during solder jet bonding (SJB) may result in a high level of defects. Most burning defects may occur at the polyimide base beside the suspension pad at the bottom half of the suspension pad length. There is a need, therefore, to find a solution that improves yield in solder jet bonding between suspensions and sliders in hard disk drive head stack assemblies.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

Figure 1:
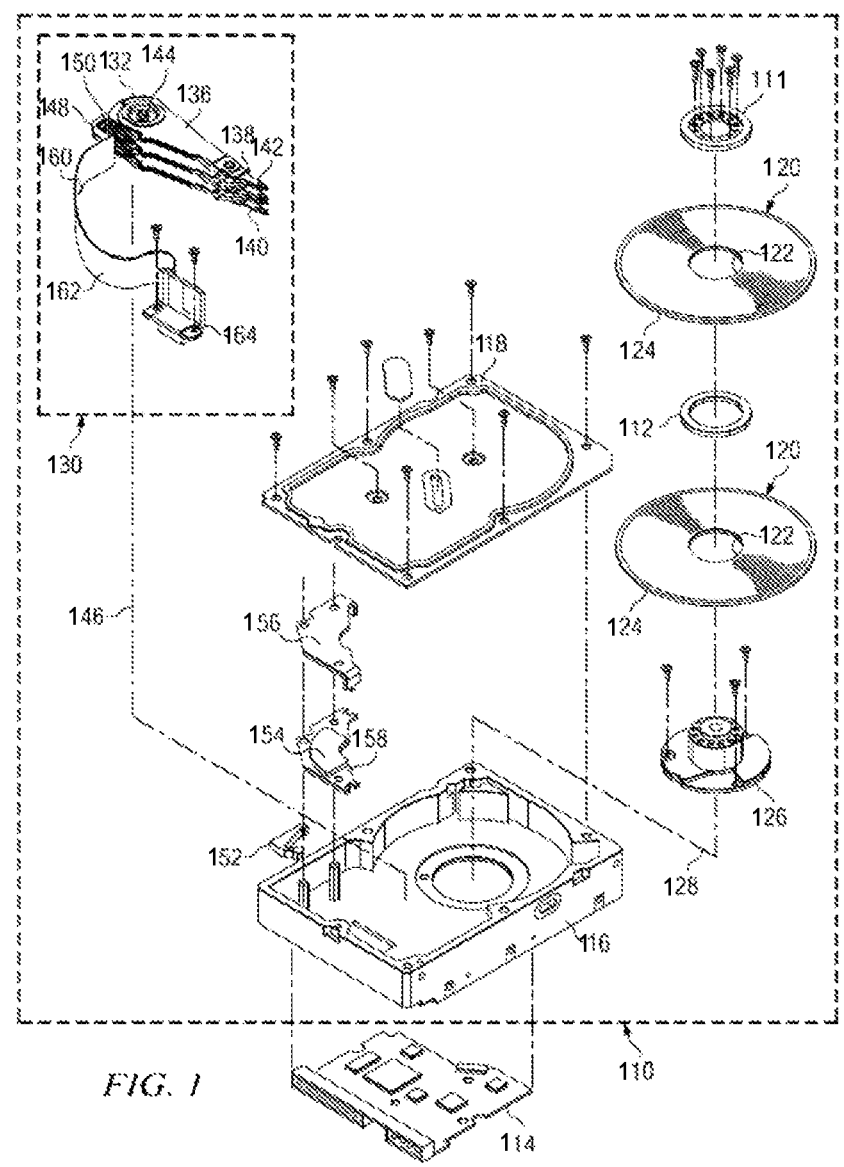
FIG. 1 is an exploded perspective view of an exemplary embodiment of a disk drive in accordance with the disclosure.

Various aspects of a laminated structure are disclosed. The laminated structure includes a metallic layer, a dielectric layer on the metallic layer, wherein the dielectric layer and metallic layer have a slot formed therein, and one or more conductive traces on the dielectric layer opposite the metallic layer, wherein the ends of the one or more traces terminate to form bonding pads extending into the slot.

Various aspects of a method of forming a slotted laminated structure are disclosed. The method includes forming a metallic layer, forming a dielectric layer on the metallic layer, forming a slot in the dielectric layer and metallic layer, and forming one or more electrically conductive traces on the dielectric layer opposite the metallic layer, wherein ends of the one or more traces are formed to terminate with bonding pads extending into the slot.

Various aspects of a hard disk drive are disclosed. The hard disk drive includes a rotatable magnetic recording disk, one or more actuator arms arranged to access the magnetic recording disk, a head gimbal assembly arranged with each actuator arm comprising a magnetic head adjacent to the rotatable magnetic recording disk for reading and/or writing to the rotatable magnetic recording disk, and a laminated suspension flexure electrically coupled to the magnetic head, the suspension flexure comprising a metallic layer, a dielectric layer on the metallic layer, wherein the dielectric layer and metallic layer have a slot formed therein, and one or more electrically conductive traces on the dielectric layer opposite the metallic layer, wherein the ends of the one or more traces terminate to form bonding pads extending into the slot.

Various aspects of a head gimbal assembly for a hard disk drive are disclosed. The head gimbal assembly includes a magnetic head, a laminated suspension flexure electrically coupled to the magnetic head, wherein the suspension flexure includes a metallic layer, a dielectric layer on the metallic layer, wherein the dielectric layer and metallic layer have a slot formed therein, and one or more conductive traces on the dielectric layer opposite the metallic layer, wherein the ends of the one or more traces terminate to form bonding pads extending into the slot.

It will be understood that other aspects of the present invention will become readily apparent to those skilled in the art from the following detailed description, wherein it is shown and described only several embodiments of the invention by way of illustration. As will be realized by those skilled in the art, the present invention is capable of other and different embodiments and its several details are capable of modification in various other respects, all without departing from the spirit and scope of the invention. Accordingly, the drawings and detailed description are to be regarded as illustrative in nature and not as restrictive.

The detailed description is intended to provide a description of various exemplary embodiments of the present invention and is not intended to represent the only embodiments in which the invention may be practiced. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure.

The word "exemplary" is used herein to mean serving as an example, instance, or illustration. Any embodiment described herein as "exemplary" is not necessarily to be construed as preferred or advantageous over other embodiments. Likewise, the term "embodiment" of an apparatus or method does not require that all embodiments of the invention include the described components, structure, features, functionality, processes, advantages, benefits, or modes of operation.

Various aspects of the present invention will be described herein with reference to drawings that are schematic illustrations of idealized configurations of the present invention. As such, variations from the shapes of the illustrations as a result, for example, manufacturing techniques and/or tolerances, are to be expected. Thus, the various aspects of the present invention presented throughout this disclosure should not be construed as limited to the particular shapes of elements (e.g., regions, layers, sections, substrates, etc.) illustrated and described herein but are to include deviations in shapes that result, for example, from manufacturing. By way of example, an element illustrated or described as a rectangle may have rounded or curved features and/or a gradient concentration at its edges rather than a discrete change from one element to another. Thus, the elements illustrated in the drawings are schematic in nature and their shapes are not intended to illustrate the precise shape of an element and are not intended to limit the scope of the present invention.

It will be understood that when an element such as a region, layer, section, substrate, or the like, is referred to as being "on" another element, it can be directly on the other element or intervening elements may also be present. In contrast, when an element is referred to as being "directly on" another element, there are no intervening elements present. It will be further understood that when an element is referred to as being "formed" on another element, it can be grown, deposited, etched, attached, connected, coupled, or otherwise prepared or fabricated on the other element or an intervening element.

The terms "connected," "coupled," or any variant thereof, mean any connection or coupling, either direct or indirect, between two or more elements, and can encompass the presence of one or more intermediate elements between two elements that are "connected" or "coupled" together. The coupling or connection between the elements can be physical, logical, or a combination thereof. As used herein, two elements can be considered to be "connected" or "coupled" together by the use of one or more wires, cables, printed electrical connections, or any other suitable means.

Several aspects of laminated structures will be presented in the context of suspension flexures for hard disk drives. However, as those skilled in the art will readily appreciate, such aspects of laminated structures are not limited to suspension flexures. According any reference to a specific apparatus or method is intended only to illustrate exemplary applications of laminated structures with the understanding that various aspects of laminated structures presented throughout this disclosure have a wide range of applications.

FIG. 1 is an exploded perspective view of an exemplary embodiment of a disk drive. The disk drive includes a head disk assembly (HDA) 101 and a printed circuit board assembly (PCBA) 114. The HDA 101 includes a base 116 and cover 118 that together house at least one annular magnetic disk 120. Each disk 120 contains a plurality of magnetic tracks for storing data. The tracks are disposed upon opposing first and second disk surfaces of the disk 120 that extend between an inner disk edge 122 (corresponding to the inner diameter) and an outer disk edge 124 (corresponding to the outer diameter) of the disk 120. The head disk assembly 110 further includes a spindle motor 126 for rotating the disk 120 about a disk axis of rotation 128. The spindle motor 126 includes a spindle motor hub that is rotatably attached to the base 116 of the HDA 110. Disks 120 may be stacked and separated with one or more annular disk spacers 112 that are disposed about the hub, all held fixed to the hub by disk clamp 111.

The HDA 101 further includes a head stack assembly (HSA) 130 rotatably attached to the base 116 of HDA 101. The HSA 130 includes an actuator comprising an actuator body 132 and one or more actuator arms 36 extending from the actuator body 132. The actuator body 132 includes a bore 144 and a pivot bearing cartridge engaged within the bore for facilitating the HSA 130 to rotate relative to HDA 101 about actuator pivot axis 146. One or two head gimbal assemblies (HGA) 138 are attached to a distal end of each actuator arm 136. Each HGA includes a head (e.g. head 140) for reading and writing data from and to the disk 120, and a load beam 142 to compliantly preload the head against the disk 120. The HSA 130 further includes a coil support 148 that extends from one side of the HSA 130 that is opposite head 140. The coil support 148 is configured to support a coil 150 through which a changing electrical current is passed. The coil 150 interacts with one or more magnets 154 that are attached to base 116 via a yoke structure 156, 158 to form a voice coil motor for controllably rotating the HSA 130. HDA 101 includes a latch 152 rotatably mounted on base 116 to prevent undesired rotations of HSA 130.

The PCBA 114 includes a servo control system for generating servo control signals to control the current through the coil 150 and thereby position the HSA 130 relative to tracks disposed upon surfaces of disk 120. The PCBA 114 also includes channel electronics to receive and provide electrical signals to the heads 140 of the HGAs 138 of the HSA 130, e.g. for reading and writing data to the disks 10. The HSA 130 is electrically connected to PCBA 114 via a flexible printed circuit (FPC) 160, which includes a flex cable 162 and a flex cable support bracket 164. The flex cable 162 supplies current to the coil 150 and carries signals between the HSA 130 and the PCBA 114.

Figure 2:
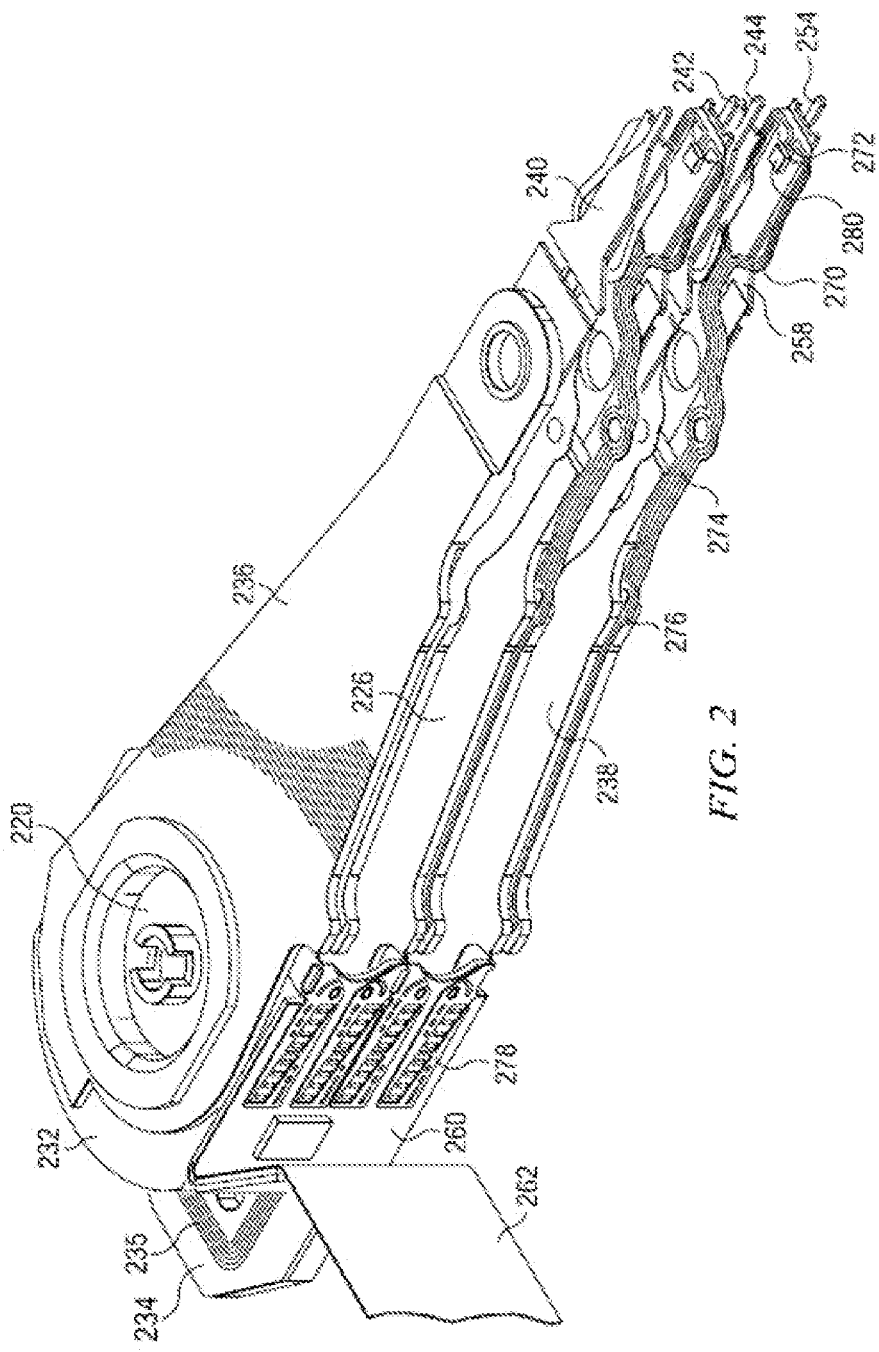
FIG. 2 is a perspective view of an exemplary embodiment of a head stack assembly (HSA) in accordance with the disclosure.

FIG. 2 is a perspective view of an exemplary embodiment of a head stack assembly (HSA) 130. The HSA 130 includes an actuator body 232 and a plurality of actuator arms 226, 236, 238 extending from the actuator body 232. The actuator body 232 includes a pivot bearing cartridge 220 disposed in the actuator bore, and a coil support 234 that supports a coil 235 and extends from the actuator body 232 in a direction that is generally opposite the actuator arms 226, 236, 238. The HSA 130 also includes a plurality of head gimbal assemblies (HGA) 240, 242, 244, 254, attached to the actuator arms 226, 236, 238. Note that the inner actuator arm 226 includes two HGAs, 242, 244, while each of the outer actuator arms 236, 238, includes only one HGA. This is because in a fully populated disk drive the inner arm(s) are positioned between two disk surfaces while the outer actuator arms are positioned over (or under) a single disk surface. In a depopulated disk drive, however, any of the actuator arms may have one or zero HGAs, possibly replaced by a dummy mass.

Each HGA includes a head for reading and/or writing to an adjacent disk surface (e.g. HGA 254 includes head 280). The head 280 is attached to a tongue portion 272 of a laminated suspension flexure 270. The laminated flexure 270 is part of the HGA 254, and is attached to a load beam 258 (another part of the HGA 254). The laminated suspension flexure 270 may include a structural layer (e.g., SST), dielectric layers (e.g. polyimide, or PI), and conductive layers into which traces are patterned (e.g. copper) so that the signals may be transmitted to and from the head along the actuator body 232. The HSA 200 also includes a flexible printed circuit (FPC) 260 adjacent the actuator body 232, and the FPC 260 includes a flex cable 262. The FPC 260 may comprise a laminate that includes two or more conventional dielectric and conductive layer materials (e.g. one or more polymeric materials, copper, etc). The laminated suspension flexure 270 includes a flexure tail 274 that includes an intermediate region 276 that is disposed adjacent the actuator arm 238, and a terminal region 278 that is electrically connected to bond pads of the FPC 260.

In the plan view in FIG. 3, a portion 300 of a suspension flexure 270 includes a plurality of electrically conductive suspension traces 310 shown on the polyimide (PI) base 320, and the PI base 320 is supported by a stainless steel (SST) base 330 (not visible in FIG. 3, where it is underneath the PI base 320; see FIG. 4 and discussion below). The plurality of suspension traces 310 may terminate as suspension bond pads 315. The plurality of suspension bond pads 315 may be arranged to solder to a corresponding plurality of pads on the head 140/280 (see FIGS. 1 and 2). In one embodiment, the PI base 320 and the SST 330 each include a slot 340 to separate and provide a gap between adjacent suspension bond pads 315, whereas in a conventional suspension bond pad, the PI base and the SST base may be continuous. In the conventional suspension bond pad solder bridging and burning of the polyimide may occur.

In one embodiment, the suspension traces 310 have a bond pad portion 315 that overlay and are laminated to the PI base 320 and extend, like "fingers," into the slot 340 formed in the PI base 320 and SST 330, leaving open gaps between the extended bond pad portions 315.

The suspension 300 may be cut, for example, along line A, to remove a portion of the suspension to expose the bond pad portions 315 in order to make contact for soldering with the corresponding pads on the head.

Figure 3:
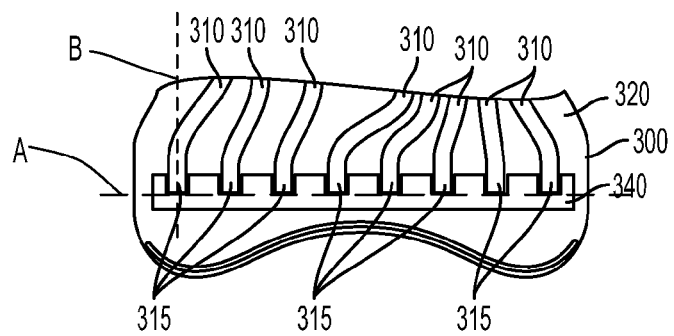
FIG. 3 is a plan view of an exemplary embodiment of suspension bond pads in accordance with the disclosure.
Figure 4:
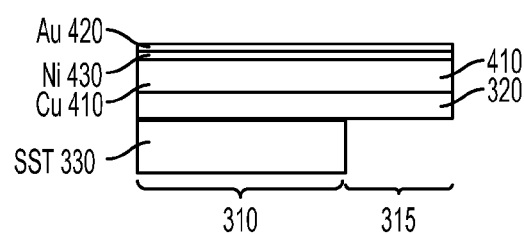
FIG. 4 is a cross-section view of an exemplary embodiment of a section of a suspension bond pad in accordance with the disclosure.

FIG. 4 is a cross-section of the suspension trace 310 and bond pad portion 315 metallization (e.g., Cu 410 with Au 420/Ni 430) laminated to the PI base 320 (dielectric) overhanging the edge of the SST base 330, like a "finger" and extending into the gap formed by the slot 340, taken across the dotted line B in FIG. 3. The PI base 320 underlies (i.e., remains laminated to) the suspension bond pad portions 315 in the slot 340 in the SST 330. As a result, because there is no physical bridge between adjacent bond pad portions 315, the possibility of solder bridging may be reduced. Furthermore, the absence of exposed PI base 320 in the soldering region may result in a reduction of dielectric polyimide burning.

In an alternative embodiment, the suspension bond pad metallization may overhang the edge of the SST base without the PI layer laminated in the "finger" portion. As a result, the occurrence of solder bridging and polyimide burning may be reduced as well.

Figure 5:
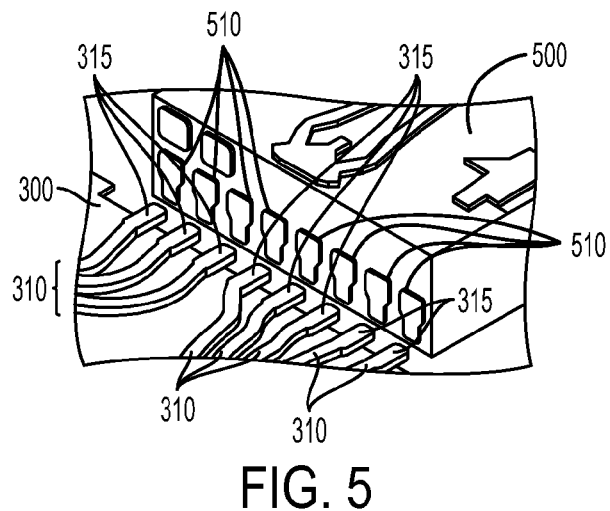
FIG. 5 is a perspective view of an exemplary embodiment of a group of suspension bond pads in proximity to a slider with corresponding slider bond pads in accordance with the disclosure.

The perspective view in FIG. 5 shows the suspension bond pad portion 315 located near 8 slider pads 510 on a slider 500 before solder jet bonding. The suspension bond pad portions 315 and slider pads 510 may be brought into aligned contact and soldered together using, for example solder jet bonding technology. Solder jet bonding is an ink-jetting method adapted to disperse molten metal solder drops to form small bond connections. The resulting technology can produce droplets as small as 40 microns across and can produce and place with precision molten solder droplets at rates of 2,000 droplets per second. After inkjet-type solder deposition, on the slider pads 510, for example, the slider 500 and suspension flexure 300 parts may be heated to form a bond. Alternatively, the parts may be aligned and joined, and the solder jet forms bonds at the contact interface of each of the respective suspension aligned bond pad portion 315/slider pad 510 pair.

The reduction or elimination of solder bridging between bond pad portions 315 or burning of PI base 320 during soldering (e.g., by solder jet bonding) may improve yield and reduce bonding equipment down time for cleaning.

Figure 6:
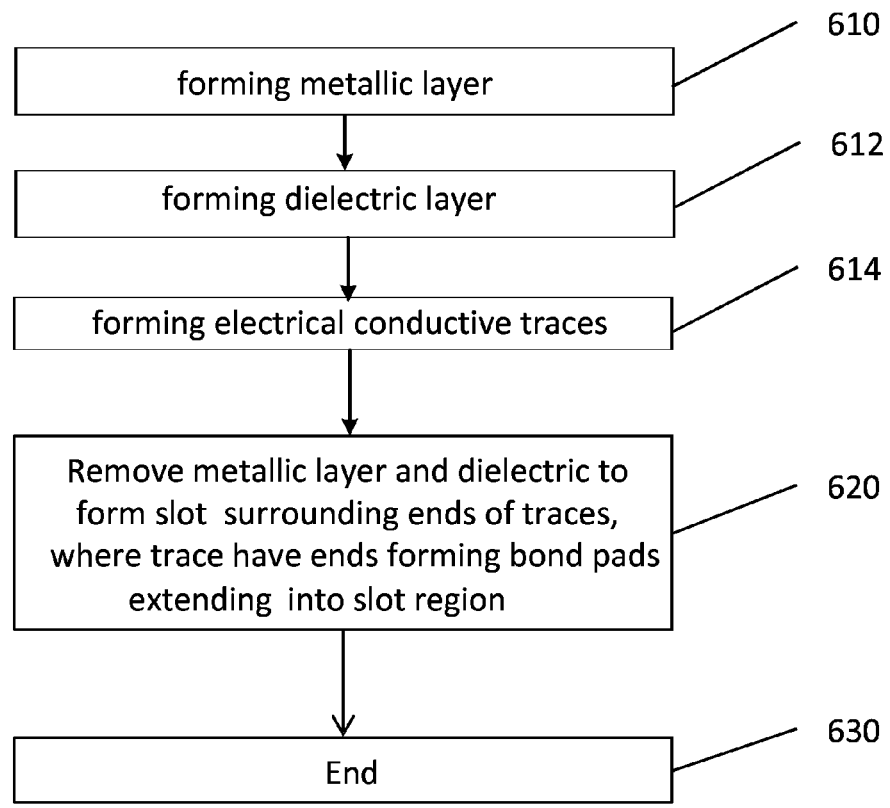
FIG. 6 is a flow diagram of a first embodiment of a method of forming a slotted laminated structure in accordance with the disclosure.

FIG. 6 is a flow diagram of a first embodiment of a method of forming a slotted laminated structure in a suspension flexure. Referring to FIGS. 3 and 6, the method begins at process block 610 by forming a metallic layer 330. In process block 612 a dielectric layer 320 may be formed on the metallic layer 330. In process block 614 electrically conductive traces 310 may be formed on the dielectric layer 320 opposite the metallic layer 330.

In process block 620 portions of the metallic layer 330 and the dielectric layer 320 may be removed to form the slot 340 surrounding the trace ends referred to as the suspension bond pads 315 so that the suspension bond pads 315 extend into the slot region 340. The bond pads 315 extending into the slot 340 may have adjacent dielectric layer extending into the slot 340 laminated with the bond pads. The slot region is an open area devoid of material apart from the suspension bond pads 315 and adjacent dielectric layer laminated to the bond pads 315. The method may then terminate at end block 630.

In the method described above with respect to FIG. 6, the suspension bond pads 315 may still have a portion of the dielectric layer 320 laminated to the suspension bond pads 315. However, there still exists the possibility that burning or charring of the dielectric layer 320 beneath the suspension bond pads may occur during the bonding process. It may therefore be desirable to remove a portion of the dielectric layer 320 beneath the suspension bond pads 315 in the region of the slot.

Figure 7:
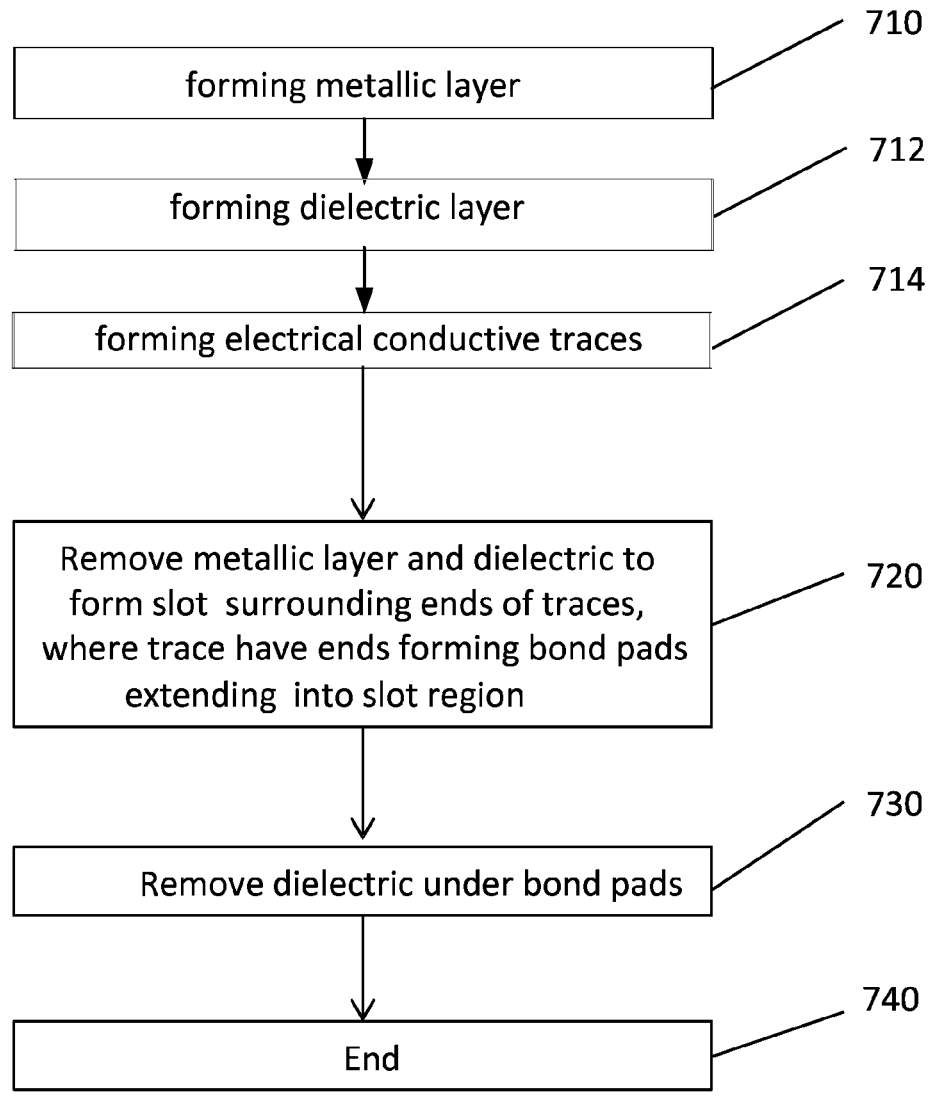
FIG. 7 is a flow diagram of a second embodiment of a method of forming a slotted laminated structure in accordance with the disclosure.

FIG. 7 is a flow diagram of a second embodiment of a method of forming a slotted laminated structure in a suspension flexure. Referring to FIGS. 3 and 7, the method begins at process block 710 by forming a metallic layer 330. In process block 712 electrically conductive traces 310 may be formed on the dielectric layer 320 opposite the metallic layer 330.

In process block 720 portions of the metallic layer 330 and the dielectric layer 320 may be removed to form the slot 340 surrounding the suspension bond pads 315 so that the suspension bond pads 315 extend into the slot region 340. The slot region is an open area devoid of material apart from the suspension bond pads 315. The suspension bond pads 315 may still have portions of the dielectric layer 320 laminated to the suspension bond pads 315.

In process block 730 the portions of the dielectric layer 320 laminated to the suspension bond pads 315, i.e., dielectric layer 320 which extends into the slot, may be removed.

After removal of the dielectric layer 320 laminated to the suspension bond pads, the method terminates at end block 740.

Various material removal techniques may be used to form the slot to remove the dielectric layer, metallic layer and portions of the dielectric layer material laminated to the suspension bond pads 315, including, but not limited to photolithographic resist masking and etching.

It should be appreciated that the order of some steps in the method may be altered without changing the intended result of forming the suspension bond pads 315 extending into the slot 340. For example, by using processes other than photolithography and etching, or by altering the masking polarity of the resist and employing resist lift-off processing techniques, substantially the same structure may be obtained. In the method of FIG. 7, the slot may be formed by removing the dielectric layer 320 from the suspension bond pads 315 at the same time, instead taking more than one step.

The previous description is provided to enable any person skilled in the art to fully understand the full scope of the disclosure. Modifications to the various exemplary embodiments disclosed herein will be readily apparent to those skilled in the art. Thus, the claims should not be limited to the various aspects of the disclosure described herein, but shall be accorded the full scope consistent with the language of claims. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f) unless the element is expressly recited using the phrase "means for" or, in the case of a method claim, the element is recited using the phrase "step for."

What is claimed is:

1. A laminated structure comprising:
   a metallic layer;
   a dielectric layer on the metallic layer, wherein the dielectric layer and metallic layer have a slot formed therein; and
   one or more conductive traces on the dielectric layer opposite the metallic layer, wherein the ends of the one or more traces terminate to form bonding pads extending into the slot.

2. The laminated structure of claim 1, wherein the bonding pads extend into the slot with dielectric layer adjacent to each of the bonding pads.

3. The laminated structure of claim 1, wherein the bonding pads extend into the slot without dielectric layer adjacent to each of the bonding pads.

4. The laminated structure of claim 1, wherein the metallic layer is stainless steel.

5. The laminated structure of claim 1, wherein the dielectric is polyimide.

6. The laminated structure of claim 1, wherein the conductive traces comprise one or more layers of Cu, Ni and Au.

7. A method of forming a slotted laminated structure comprising:
   forming a metallic layer;
   forming a dielectric layer on the metallic layer;
   forming a slot in the dielectric layer and metallic layer; and
   forming one or more electrically conductive traces on the dielectric layer opposite the metallic layer; wherein ends of the one or more traces are formed to terminate with bonding pads extending into the slot.

8. The method of claim 7, wherein the forming of the bonding pads comprises extending the dielectric layer into the slot adjacent to each of the bonding pads.

9. The method of claim 7, wherein the forming of the bonding pads comprises extending the bonding pads into the slot without extending the dielectric layer into the slot.

10. The method of claim 7, wherein the metallic layer is stainless steel.

11. The method of claim 7, wherein the dielectric layer is polyimide.

12. The method of claim 7, wherein the one or more electrically conductive traces comprise one or more layers Cu, Ni and Au.

13. A hard disk drive comprising:
   a rotatable magnetic recording disk;
   one or more actuator arms arranged to access the magnetic recording disk;
   a head gimbal assembly arranged with each actuator arm comprising:
      a magnetic head adjacent to the rotatable magnetic recording disk for reading and/or writing to the rotatable magnetic recording disk; and
      a laminated suspension flexure electrically coupled to the magnetic head, the suspension flexure comprising:
         a metallic layer;
         a dielectric layer on the metallic layer, wherein the dielectric layer and metallic layer have a slot formed therein; and
         one or more electrically conductive traces on the dielectric layer opposite the metallic layer, wherein the ends of the one or more traces terminate to form bonding pads extending into the slot.

14. The hard disk drive of claim 13, wherein the bonding pads extend into the slot with dielectric layer adjacent to each of the bonding pads.

15. The hard disk drive of claim 13, wherein the bonding pads extend into the slot without dielectric layer adjacent to each of the bonding pads.

16. The hard disk drive of claim 13, wherein the metallic layer is stainless steel.

17. The hard disk drive of claim 13, wherein the dielectric layer is polyimide.

18. The hard disk drive of claim 13, wherein the one or more electrically conductive traces comprise one or more layers Cu, Ni and Au.

19. A head gimbal assembly for a hard disk drive comprising:
   a magnetic head;
   a laminated suspension flexure electrically coupled to the magnetic head, the suspension flexure comprising:
      a metallic layer;
      a dielectric layer on the metallic layer, wherein the dielectric layer and metallic layer have a slot formed therein; and
      one or more electrically conductive traces on the dielectric layer opposite the metallic layer, wherein the ends of the one or more traces terminate to form bonding pads extending into the slot.

20. The head gimbal assembly of claim 19, wherein the bonding pads extend into the slot with dielectric layer adjacent to each of the bonding pads.

21. The head gimbal assembly of claim 19, wherein the bonding pads extend into the slot without dielectric layer adjacent to each of the bonding pads.

22. The head gimbal assembly of claim 19, wherein the metallic layer is stainless steel.

23. The head gimbal assembly of claim 19, wherein the dielectric layer is polyimide.

24. The head gimbal assembly of claim 19, wherein the one or more electrically conductive traces comprise one or more layers Cu, Ni and Au.

* * * * *